Sept. 29, 1925.
A. H. LEIPERT
SPRING MOUNTING FOR MOTOR VEHICLES
Filed April 27, 1923
1,555,593
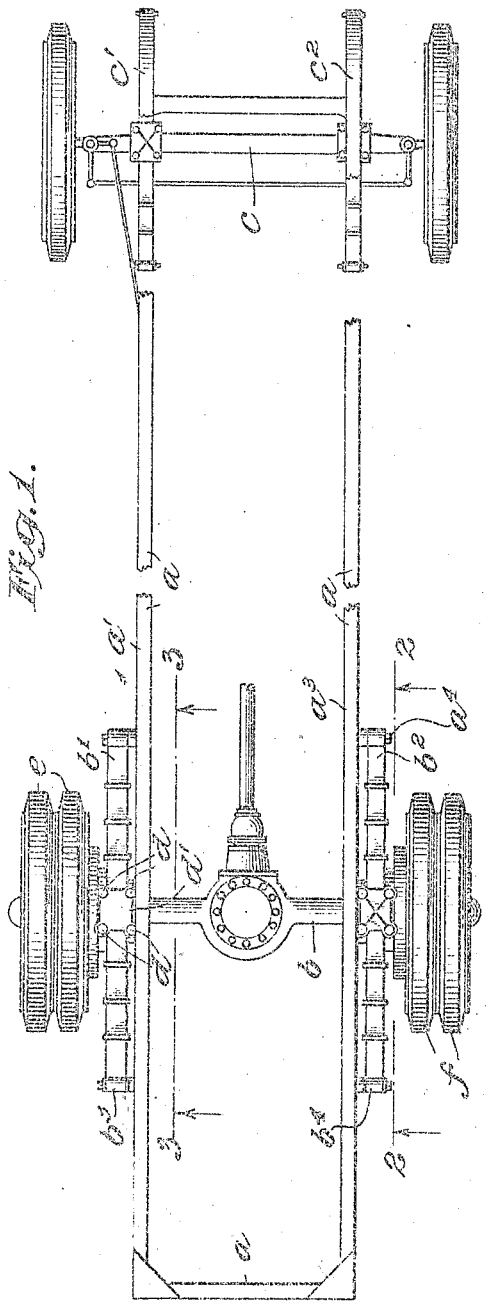
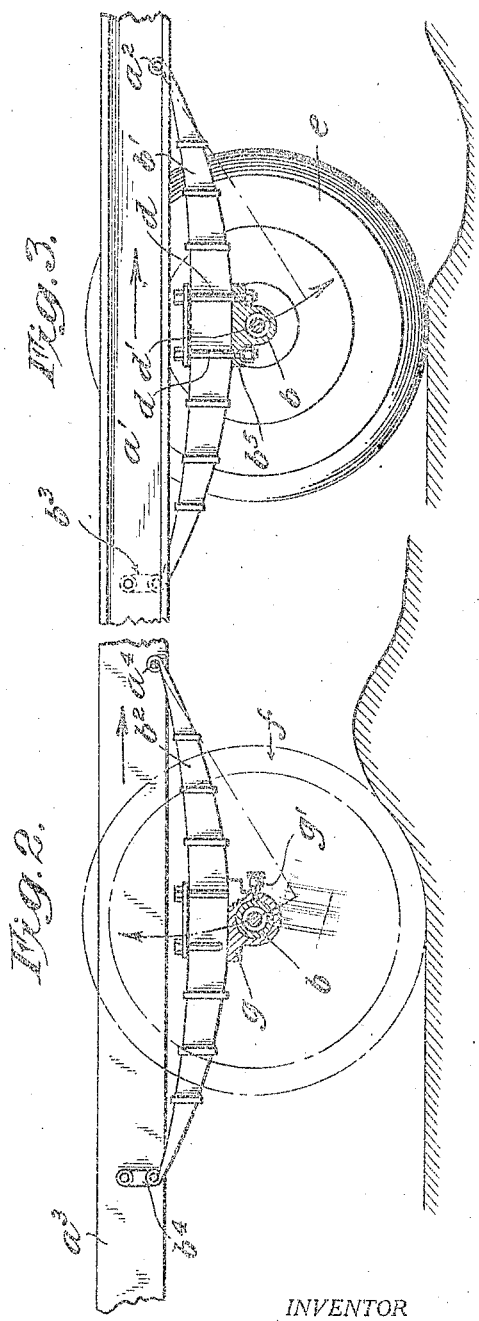
INVENTOR
August H. Leipert
BY
Redding, Greeley, O'Shea & Campbell
ATTORNEYS Patented Sept. 29, 1925.

1,555,593

UNITED STATES PATENT OFFICE.

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE.

SPRING MOUNTING FOR MOTOR VEHICLES.

Application filed April 27, 1923. Serial No. 634,980.

*To all whom it may concern:*

Be it known that I, AUGUST H. LEIPERT, a citizen of the United States, residing at College Point, in the borough of Queens, of the city of New York, in the State of New York, have invented certain new and useful Improvements in Spring Mountings for Motor Vehicles, of which the following is a specification, reference being had to the accompanying drawing, forming a part hereof.

This invention relates generally to an improved spring mounting for motor vehicles and particularly vehicles of the Hotchkiss drive wherein the driving force is transmitted to the frame through the rear springs. The general objects of the invention are to relieve the frame and spring and axles from those stresses which result from twisting movements impressed on such parts when rigidly interconnected by reason of the variable vertical movements of the separate wheels when following irregularities in the road surface. At present, it is the practice to fix the supporting springs of a motor vehicle rigidly on the axles through saddles thereby constraining the axles to follow the movements of the springs. Divergent movements of the opposite springs of a pair impress torsional strains on the axle to which they are rigidly connected and these strains are transmitted to the side frame members to which the springs are connected. The result is constant stresses of great moment on both the axles and the side frame members.

In accordance with the present invention it is proposed to mount one of the springs of a pair in a motor vehicle loosely on the axle so that the axle may oscillate on its own axis with respect to the spring and secure the other spring of the pair rigidly to the axle so that the axle is constrained to follow the movements thereof. Since the springs swing about the pins through which they are connected to the frame the axle is also swung about such pins as centers and tends to rock on its own axis. By leaving the axle free with respect to one of the springs it is permitted to rock on its own axis while following the movements of the other spring to which it is rigidly connected. This, to a great extent, relieves the axle of all twisting stresses and the frame of the vehicle of the reaction required to such stresses as are ordinarily transmitted therethrough by reason of divergent movements of the axle under the influence of the different springs of a pair when the vehicle is traveling over an uneven road surface.

In the preferred embodiment, as indicated hereinbefore, the improvements are incorporated in a Hotchkiss drive. Since one of the springs is rigidly connected to the axle the torque stresses are taken by it while the other spring though freely mounted on the axle does its part of the work in transmitting the driving forces to the frame. The mounting of the springs on the front axle may be similar and it is thought to be the best practice to rigidly connect one spring of the pair at the front on the side opposite to the rigid connection of one spring of the pair at the rear thereby affording the greatest degree of flexibility for the frame and the axles.

The breadth of the invention and the preferred means for practicing it will appear in greater detail from the description given with reference to the embodiment shown in the drawings wherein:

Figure 1 is a view in plan of so much of the chassis of a motor vehicle as is necessary for an illustration of the application of the improvements thereto.

Figure 2 is a view partly in side elevation and partly in section of the right hand rear wheel shown in Figure 1 and taken on the plane indicated by the line 2—2 of Figure 1 and looking in the direction of the arrows.

Figure 3 is a view in section taken on the plane indicated by the line 3—3 of Figure 1 and looking in the direction of the arrows, Figures 2 and 3 being intended to illustrate schematically the condition of the road surface which might be encountered by the two wheels simultaneously.

As indicated hereinbefore, the invention is primarily designed with reference to its incorporation in a motor vehicle in which the Hotchkiss drive is employed, that is, where the driving forces are transmitted to the frame through the rear springs. The drawings show in a somewhat conventional manner those elements of a vehicle which are necessarily present in securing the results sought for. The chassis $a$ is mounted on a rear axle tube $b$ and front axle $c$ by means of springs $b'$, $b^2$, and $c'$, $c^2$, respectively. The conditions secured in and about the mounting of the rear springs will first be described since it is evident to one skilled in the art that some of the advantageous results described may be secured in a construction wherein only one pair of springs of a vehicle are mounted in accordance with the improvements. The front end of the spring $b'$ is pivoted to one of the side frame members $a'$ while the front end of the other rear spring $b^2$ is pivoted to the other side frame member $a^3$ as by a pin $a^4$. Shackles $b^3$, $b^4$, may connect the rear ends of the springs $b'$, $b^2$, respectively, to the respective side frame members $a'$, $a^3$. It is the common practice to rigidly connect the axle tube $b$ to each of the rear springs in some such manner as is illustrated in Figure 3 where a spring perch $b^5$ is formed integral with the tube $b$ and is connected rigidly to the spring $b'$ by U-bolts $d$, passing through a saddle $d'$. If both rear springs $b'$, $b^2$ were thus rigidly connected to the axle tube $b$ it is evident that when they swing about their respective pins $a^2$, $a^4$, the tube is constrained to follow such swinging movements. Figures 2 and 3 indicate typical road surface conditions at opposite sides of the vehicle and these figures suggest, for instance, that while the left hand rear wheel $e$ is about to go in a depression the right hand rear wheel $f$ is about to go over an elevation. Thus, while the spring $b'$ is swinging downwardly the spring $b^2$ is swinging upwardly. When the axle tube $b$ is constrained to follow such divergent movements it is manifestly subjected to great twisting stresses. These stresses find their re-action at the points of connection of the springs with the respective side frame members. In this way, the side frame members are subjected to great stresses and the entire chassis itself is maintained under constant stresses which instead of making for flexibility contribute to rigidity and hard riding. By the present invention it is proposed to prevent the constraining of the axle $b$ through the two springs $b'$, $b^2$ of a pair so that while the axle is rigidly connected to one of the springs $b'$ it is free to rock on its own axis with respect to the other spring $b^2$. The invention is not concerned with the particular connection by which this freedom is achieved but as indicated in Figure 2 the spring perch $g$ is formed independently of the tube $b$ but bears thereon and may be lubricated through a cup $g'$. If the tube $b$ is subject to twisting stresses which tend to rock it in one direction or another it is free to rock within the spring perch $g$ as will be evident and in that way the axle is relieved of the stresses which such twisting strains set up ordinarily.

When the improved mounting is also incorporated in the front end of a chassis it is preferred to place the free bearing marked X at the opposite side of the frame from the free bearing marked X for the left hand rear spring $b'$. In this case, the rigid connection between the left hand front spring $c'$ and the axle $c$ is placed at the opposite side of the chassis from the rigid connection between the right hand rear spring $b^2$ and the axle $b$. It is unnecessary to describe in detail the connections between the springs $c'$, $c^2$, and the axle $c$ since they may be of the same general character as described with reference to the free and rigid connections between the rear axle $b$ and the rear springs. By placing the free connections on the two axles at opposite sides of the chassis frame the greatest possible degree of flexibility is afforded in that the frame is relieved of stresses and is free to weave regardless of the relative positions of the four wheels.

Changes in details of construction may be made without departing from the spirit and scope of the invention so long as the underlying principle of connecting one spring of a pair rigidly to an axle and the other spring loosely, is employed.

What I claim is:

1. In motor vehicle construction wherein the driving forces are transmitted through the spring suspension in combination with a chassis, axle and springs connected to the chassis and to the axle, means to connect one of the springs rigidly to the axle and means to connect the other spring to the axle with capacity for freedom of angular movement.

2. In motor vehicle construction wherein the driving forces are transmitted through the spring suspension in combination with a chassis and axle, springs pivoted at their front ends to the chassis, means to secure one of the springs rigidly to the axle and an independent seat for the other spring journaled loosely on the axle with capacity for angular movement with respect thereto.

3. In motor vehicle construction wherein the driving forces are transmitted through the spring suspension in combination with the chassis and front and rear axles, pairs of springs connected to the chassis and to the respective axles, means to connect one of the springs of each of the pairs rigidly to its axle and means to connect the other of the springs of each of the pairs to its axle with freedom for relative angular movement of the axle.

4. In motor vehicle construction wherein the driving forces are transmitted through the spring suspension in combination with the chassis and front and rear axles, pairs of springs connected to the chassis and to the respective axles, means to connect one of the springs of each of the pairs rigidly to its axle and means to connect the other of the springs of each of the pairs to its axle with freedom for relative angular movement of the axle, said last named connections being applied to the springs at the opposite sides of the chassis frame.

5. In motor vehicle construction wherein driving forces are transmitted through the spring suspension, in combination with the chassis frame and two axles, spring suspensions connecting the chassis frame and the axles, respectively, means to connect one of the springs of the suspension rigidly to each axle, and means to connect a spring with the other end of each axle with provision for relative movement therebetween.

This specification signed this 21st day of April, A. D. 1923.

AUGUST H. LEIPERT.